United States Patent
Hernandez et al.

(10) Patent No.: US 9,039,483 B2
(45) Date of Patent: May 26, 2015

(54) PRINT-LEVEL SENSING FOR INTERACTIVE PLAY WITH A PRINTED IMAGE

(75) Inventors: Teddi Norman Hernandez, Overland Park, KS (US); John Nathan Dawbarn, Olathe, KS (US); Douglas Lee Krivanek, Lenexa, KS (US); Terrence Michael Turner, Westwood Hills, KS (US)

(73) Assignee: HALLMARK CARDS, INCORPORATED, Kansas City, MO (US)

( * ) Notice: Subject to any disclaimer, the term of this patent is extended or adjusted under 35 U.S.C. 154(b) by 374 days.

(21) Appl. No.: 13/540,299

(22) Filed: Jul. 2, 2012

(65) Prior Publication Data

US 2014/0002831 A1   Jan. 2, 2014

(51) Int. Cl.
*A63H 3/52* (2006.01)
*A63F 3/00* (2006.01)
*A63F 9/24* (2006.01)
*G09B 5/06* (2006.01)

(52) U.S. Cl.
CPC ... *A63F 3/00643* (2013.01); *A63F 2003/00652* (2013.01); *A63F 2009/2445* (2013.01); *A63F 3/00006* (2013.01); *G09B 5/062* (2013.01)

(58) Field of Classification Search
USPC .......................................................... 446/268
See application file for complete search history.

(56) References Cited

U.S. PATENT DOCUMENTS

| | | | |
|---|---|---|---|
| 3,597,082 A | 8/1971 | James et al. | |
| 4,012,232 A | 3/1977 | Uhlmann et al. | |
| 4,375,058 A | 2/1983 | Bouma et al. | |
| 4,451,911 A | 5/1984 | Klose et al. | |
| 4,857,030 A | 8/1989 | Rose | |
| 5,551,973 A | 9/1996 | Oliver et al. | |
| 5,630,743 A * | 5/1997 | Shi | 446/175 |
| 5,630,869 A | 5/1997 | Amon et al. | |
| 5,746,602 A | 5/1998 | Kikinis | |
| 5,809,625 A | 9/1998 | Young et al. | |

(Continued)

FOREIGN PATENT DOCUMENTS

WO   0043949   7/2000

OTHER PUBLICATIONS

APH Jun. 2005 newsletter, APH News Jun. 2005—http://www.aph.org/advisory/2005adv06.html, dated Jun. 1, 2005.

(Continued)

*Primary Examiner* — Tramar Harper
(74) *Attorney, Agent, or Firm* — Shook, Hardy & Bacon L.L.P.

(57) ABSTRACT

A method, system, and apparatus are provided for interactively playing with a printed image. A printed image resembling a game board, book, or picture, is provided. The printed image includes a registration area and a plurality of feedback areas in which an indicator color is printed at a predetermined level, e.g. percentage of area. A figurine is provided that includes a light source and light sensor. The light source and light sensor are placed in proximity to the designated areas in the image to sense the level of the indicator color printed therein and an associated output is provided. The registration area is useable to identify a predefined template associated with the image to allow feedback of the figurine with a plurality of different printed images. The figurine can include an ultraviolet light source to activate graphics printed in the image with photochromic ink.

19 Claims, 4 Drawing Sheets

(56) References Cited

U.S. PATENT DOCUMENTS

| | | |
|---|---|---|
| 5,977,951 A | 11/1999 | Danieli et al. |
| 5,996,893 A | 12/1999 | Soscia |
| 6,022,273 A | 2/2000 | Gabai et al. |
| 6,022,909 A | 2/2000 | Meinhardt et al. |
| 6,075,195 A | 6/2000 | Gabai et al. |
| 6,110,000 A | 8/2000 | Ting |
| 6,135,845 A | 10/2000 | Klimpert et al. |
| 6,206,745 B1 | 3/2001 | Gabai et al. |
| 6,247,649 B1 | 6/2001 | Nada |
| 6,264,523 B1 | 7/2001 | Simmons |
| 6,290,566 B1 | 9/2001 | Gabai et al. |
| 6,309,275 B1 | 10/2001 | Fong et al. |
| 6,358,111 B1 | 3/2002 | Fong et al. |
| 6,375,535 B1 | 4/2002 | Fong et al. |
| 6,421,470 B1 | 7/2002 | Nozaki et al. |
| 6,454,625 B1 | 9/2002 | Fong et al. |
| 6,460,155 B1 | 10/2002 | Nagasaki et al. |
| 6,497,604 B2 | 12/2002 | Fong et al. |
| 6,497,606 B2 | 12/2002 | Fong et al. |
| 6,502,756 B1 | 1/2003 | Fåhraeus |
| 6,514,117 B1 | 2/2003 | Hampton et al. |
| 6,548,768 B1 | 4/2003 | Pettersson et al. |
| 6,641,454 B2 | 11/2003 | Fong et al. |
| 6,648,719 B2 | 11/2003 | Chan |
| 6,666,376 B1 | 12/2003 | Ericson et al. |
| 6,667,695 B2 | 12/2003 | Pettersson et al. |
| 6,674,427 B1 | 1/2004 | Pettersson et al. |
| 6,732,927 B2 | 5/2004 | Olsson et al. |
| 6,773,322 B2 | 8/2004 | Gabai et al. |
| 6,773,325 B1 | 8/2004 | Mawle et al. |
| 6,773,344 B1 | 8/2004 | Gabai et al. |
| 6,836,555 B2 | 12/2004 | Ericson et al. |
| 6,910,014 B2 | 6/2005 | Silverbrook et al. |
| 7,068,941 B2 | 6/2006 | Fong et al. |
| 7,081,033 B1 | 7/2006 | Mawle et al. |
| 7,097,532 B1 * | 8/2006 | Rolicki et al. ............... 446/175 |
| 7,118,039 B1 | 10/2006 | Sun et al. |
| 7,224,348 B2 | 5/2007 | Perkins et al. |
| 7,233,320 B1 | 6/2007 | Lapstun et al. |
| 7,249,901 B2 | 7/2007 | Lapstun et al. |
| 7,252,572 B2 | 8/2007 | Wright et al. |
| 7,281,664 B1 | 10/2007 | Thaeler et al. |
| 7,568,963 B1 | 8/2009 | Atsmon et al. |
| 7,837,531 B2 | 11/2010 | Friedland et al. |
| 7,975,928 B2 | 7/2011 | Elwell |
| 2002/0145948 A1 | 10/2002 | Ando |
| 2003/0175673 A1 * | 9/2003 | Lee ............................... 434/319 |
| 2004/0023200 A1 * | 2/2004 | Blume .......................... 434/317 |
| 2004/0035620 A1 * | 2/2004 | McKeefery ................. 180/168 |
| 2005/0106547 A1 * | 5/2005 | Chiu ............................. 434/317 |
| 2006/0154559 A1 * | 7/2006 | Yoshida ....................... 446/297 |
| 2006/0259314 A1 * | 11/2006 | Furman et al. .................... 705/1 |
| 2007/0275634 A1 | 11/2007 | Wright et al. |
| 2008/0153384 A1 | 6/2008 | Friedland |
| 2008/0274769 A1 | 11/2008 | Linden |
| 2008/0293324 A1 | 11/2008 | Friedland |
| 2009/0042543 A1 | 2/2009 | Nagata et al. |
| 2009/0053972 A1 | 2/2009 | Friedland |
| 2009/0055019 A1 | 2/2009 | Stiehl et al. |
| 2009/0325456 A1 * | 12/2009 | Willett ......................... 446/175 |
| 2011/0009175 A1 | 1/2011 | Raichman et al. |
| 2012/0018507 A1 | 1/2012 | Elwell |
| 2012/0212241 A1 * | 8/2012 | Wallace et al. ............... 324/686 |
| 2014/0017974 A1 * | 1/2014 | Sofman et al. ............... 446/397 |
| 2014/0057524 A1 * | 2/2014 | Teel et al. ..................... 446/175 |

OTHER PUBLICATIONS

Brytech May 2004 press release, Coller Teller revised—http://www.brytech.com/news/revision.htm, dated Sep. 26, 2004.
AFB Magazine May 2004 issue, What Color Is Your Pair of Shoes? A Review of Two Color Identifiers—http://www.afb.org/afbpress/pub.asp?DocID=aw050308, dated May 1, 2004.
CareTec ColorTest 2000 Standard User Manual, Talking Color Identification Device, undated.
Canadian Office Action dated Feb. 13, 2015 in Application No. 2,819,722, 5 pages.

* cited by examiner

PRINT-LEVEL SENSING FOR INTERACTIVE PLAY WITH A PRINTED IMAGE

SUMMARY

Embodiments of the invention are defined by the claims below, not this summary. A high-level overview of various aspects of the invention are provided here for that reason, to provide an overview of the disclosure, and to introduce a selection of concepts that are further described in the Detailed-Description section below. This summary is not intended to identify key features or essential features of the claimed subject matter, nor is it intended to be used as an aid in isolation to determine the scope of the claimed subject matter.

In brief and at a high level, this disclosure describes, among other things, systems, methods, and apparatus for providing interactive play with use of printed materials. A printed image is provided with a plurality of feedback areas therein. The feedback areas are each printed with a predetermined level of an indicator color. A figurine is provided that includes a light source and light sensor disposed therein and which are configured to identify a designated level of the indicator color in the feedback areas when the figurine is placed in contact or in proximity to the feedback area. The light sensor is communicatively coupled to a logic controller that selects a predetermined feedback to be output upon sensing of the designated level of the indicator color. The figurine is thus useable with the printed image to interact with a scene, game, or story printed thereon and to provide audible, visual, and/or tactile outputs to a user.

The printed image might also include a number of hidden graphics printed thereon in an ink that is substantially invisible or unrecognizable in the printed image when in an equilibrium state. The figurine might also include a light-emitting diode (LED) that emits an activating light in a wavelength suitable to at least temporarily activate the ink. As such, the figurine is useable to reveal the hidden graphics by passing in close proximity to the hidden images and exposing the hidden graphics to the activating light.

DESCRIPTION OF THE DRAWINGS

Illustrative embodiments of the invention are described in detail below with reference to the attached drawing figures, and wherein.

DETAILED DESCRIPTION

The subject matter of select embodiments of the invention is described with specificity herein to meet statutory requirements. The description itself, however, is not intended to necessarily limit the scope of claims. Rather, the claimed subject matter might be embodied in other ways to include different components, steps, or combinations thereof similar to the ones described in this document, in conjunction with other present or future technologies. Terms should not be interpreted as implying any particular order among or between various steps herein disclosed unless and except when the order of individual steps is explicitly described.

Figure 1:
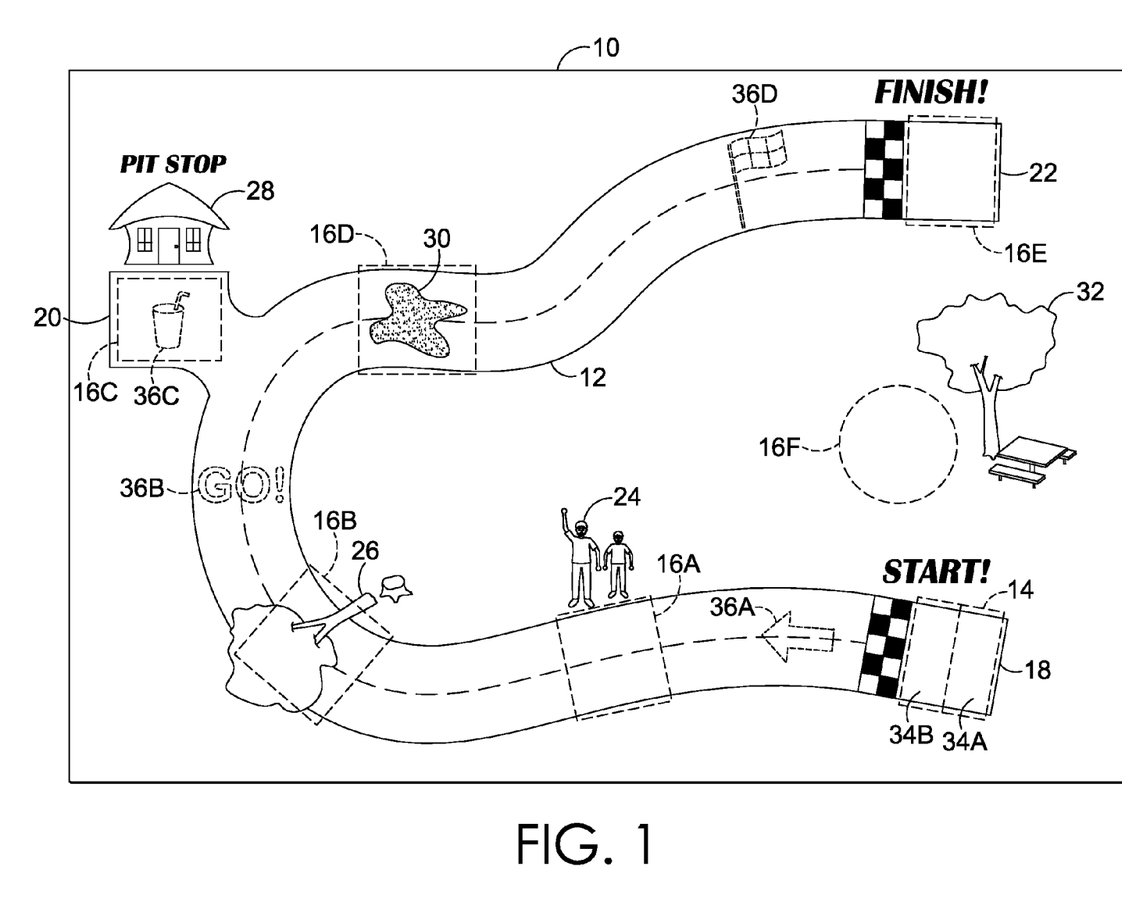
FIG. 1 depicts a sample printed image with a plurality of feedback areas thereon in accordance with an embodiment of the invention.

Embodiments of the invention include systems, methods, and apparatus for providing interactive play and/or learning with a printed image. With reference to the figures and to FIG. 1 in particular, a printed image 10 suitable for use in embodiments of the invention is described. The image 10 comprises any printed media including, for example, and not limitation, a game board, a poster, pages in a book, a greeting card, a foldable play mat, or the like. The image 10 might also include displayed images such as an image displayed on a tablet computing device, computer display screen, television, or the like. This particular exemplary image 10 depicts a race course 12 for a vehicle to follow; however, any desired illustration, graphics, images, or the like can be employed. The depiction of the image 10 is exemplary in nature and is not intended in any way to limit the content that might be provided in the image 10 in embodiments of the invention.

The image 10 includes a registration area 14 and a plurality of feedback areas 16A-F. Although six feedback areas 16A-F are shown in the image 10, any number of feedback areas 16A-F might be employed. The registration area 14 and each of the plurality of feedback areas 16A-F are of any shape and size and can be positioned in any desired location in the image 10. The areas 14 and 16A-F are visible or are distinguishable in the image 10 or might be visually indistinguishable, as depicted by their dashed outline shown in FIG. 1. The areas 14 and 16A-F might be visually defined by features in the image 10 such as a starting block 18, a driveway 20, or a finish block 22. The areas 14 and 16A-F might be associated with or adjacent to features in the image 10 depicting objects, such as, bystanders 24, a fallen tree 26, a pit stop 28, an oil slick 30, or a park 32. In another embodiment, the areas 14 and 16A-F are not associated with any feature or visual depiction in the image 10 or are associated with a portion of text (not shown) in the image 10.

The areas 14 and 16A-F each include an indicator color printed within their boundary. The indicator color comprises any available color, e.g. cyan, magenta, yellow, gray, green, orange, purple, black, or white, that can be printed in the printed image 10. In an embodiment, the indicator color is printed with an ink, dye, or pigment, or other formulation that is substantially not visible to a human viewer under standard lighting and viewing conditions.

The indicator color is printed in each of the areas 14 and 16A-F at a respective level that is the same or different between each of the areas 14 and 16A-F. The printing of the indicator color is equally distributed across the areas 14 and 16A-F. The level of the indicator color comprises the percentage of area covered by the indicator color within the areas 14 and 16A-F. In an embodiment, the indicator color and the image 10 are printed as a plurality of tightly spaced dots as is known in the art; the percentage of the number of dots comprising the indicator color is useable to determine the area percentage of the indicator color and/or the level of the indicator color.

Levels of the indicator color are defined for each of a plurality of different area percentages that are reliably distinguishable by a sensor (such as a sensor 104 described below). In an embodiment, the levels are selected with a sufficient difference therebetween to account for variations in printings of the image 10 and in calibrations of sensors used to sense the levels as described below. For example, eight different levels of the indicator color might be defined corresponding to area percentages of the indicator color including 100%, 72%, 59%, 47%, 37%, 23%, 12%, and 0%. In embodiments, any number of levels corresponding with any desired area percentages of the indicator color are defined.

The printing of the indicator color in the areas 14 and 16A-F can be recognizable by a viewer or can be masked by other printing in the image 10, e.g. where blue is used as an indicator color, the areas 14 and 16A-F might appear blue or the blue color might be masked by other printing to cause the areas 14 and 16A-F to appear another color. In another embodiment, a plurality of different indicator colors is employed, e.g. red and blue are both used as indicator colors and levels thereof are defined.

The registration area 14 is specifically demarcated in the image 10 such that a user can recognize the registration area 14 as such and recognize its location in the image 10. The level of the indicator color printed in the registration area 14 is useable to identify a template that defines outputs associated with each of the feedback areas 16A-F as described more fully below. The registration area 14 may include a level of the indicator color that is not used in the feedback areas 16A-F to enable the registration area 14 to be differentiated from the feedback areas 16A-F. In an embodiment, a different indicator color is used for the registration area 14 than for the feedback areas 16A-F.

In another embodiment, the registration area 14 includes a plurality of sections 34A-B. Two sections 34A and 34B are depicted in the image 10, however any number of sections 34 can be employed in embodiments of the invention. Each of the sections 34A-B includes a different level of the indicator color. In an embodiment in which more than two sections 34 are provided, two or more non-adjacent sections 34 might include the same levels of the indicator color. The combination of the plurality of sections 34A-B is thus useable to identify the template for outputs associated with the feedback areas 16A-F.

As described previously, the feedback areas 16A-F are each printed with the indicator color at a respective level. Each of the feedback areas 16A-F can be printed with a different level or one or more of the feedback areas 16A-F can be printed with the same level of the indicator color. Based on the template identified from the registration area 14, each of the feedback areas 16A-F are associated with one or more outputs; feedback areas 16A-F that are printed with the same level of the indicator color will be associated with the same one or more outputs. The outputs include any form of audible, visual, and/or tactile output or combinations thereof, e.g. sounds, lights, and vibrations. In an embodiment, the one or more of the outputs includes an audible reading of a script or story associated with the image 10 or a corresponding feedback area 16A-F.

With continued reference to FIG. 1, in an embodiment, the image 10 includes one or more hidden graphics 36A-D printed therein. The hidden graphics 36A-D are printed in an ink, dye, pigment, or other formulation that is substantially imperceptible or not visible to a viewer under standard lighting conditions until the ink is activated by an activating light or other energy, e.g. ultraviolet or infrared light. In an embodiment, the hidden graphics 36A-D are printed in a photochromic ink or a phosphorescent ink.

Figure 2:
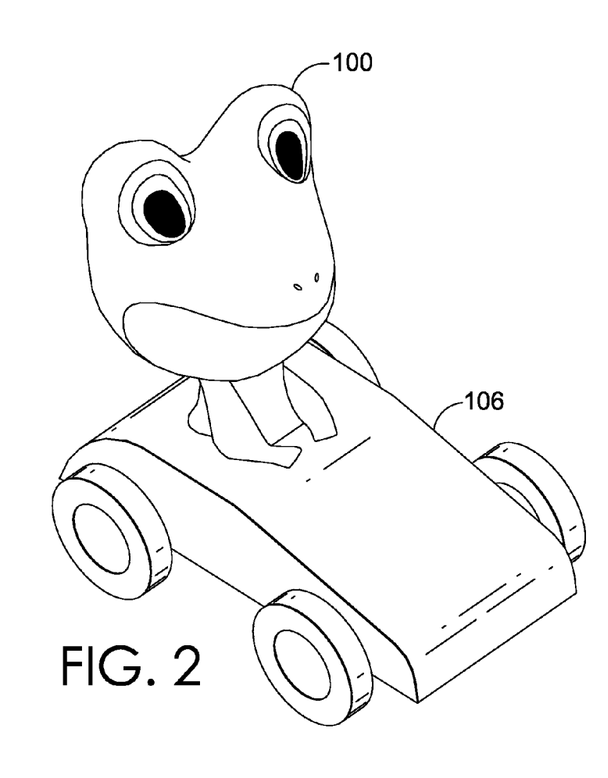
FIG. 2 is a perspective view of a sample figurine for use in combination with the printed image of FIG. 1, in accordance with an embodiment of the invention.
Figure 3:
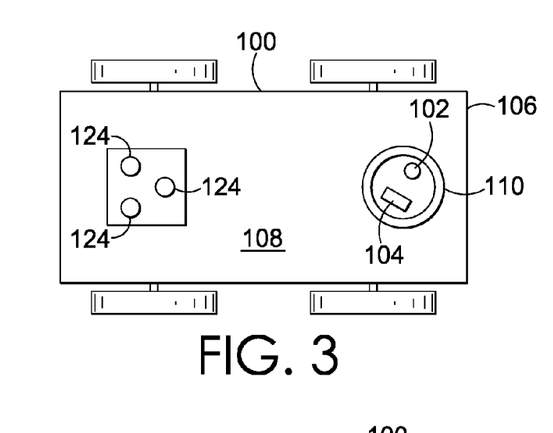
FIG. 3 is bottom plan view of the figurine of FIG. 2.
Figure 4:
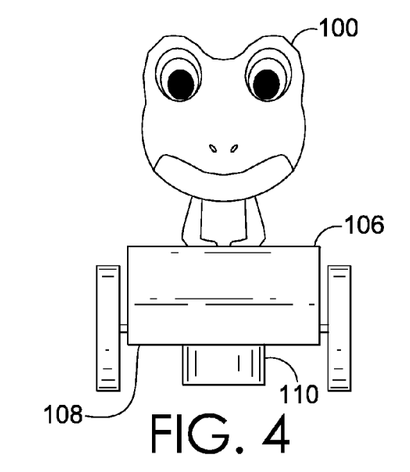
FIG. 4 is a front elevational view of the figurine of FIG. 2.
Figure 5:
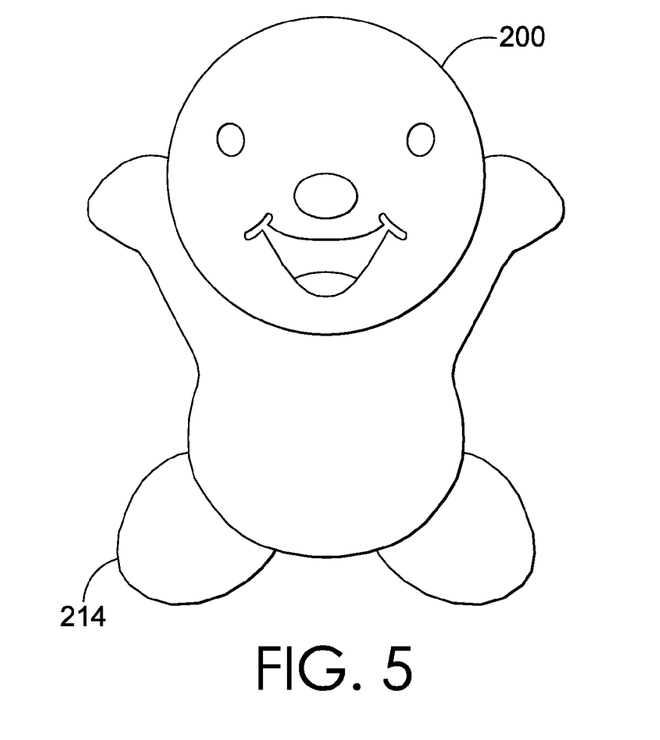
FIG. 5 is a front elevational view of an alternate embodiment of a figurine constructed in accordance with an embodiment of the invention.

With reference now to FIGS. 2-4, a figurine 100 that is useable to provide interactive play and/or learning with the image 10 is described in accordance with an embodiment of the invention. As depicted in FIGS. 2-4, the figurine 100 resembles a toy vehicle and driver, e.g. a car driven by a frog; however, the figurine 100 can take any desired form. For example, the figurine 100 might be formed to resemble an animal-like form, e.g. a dog, or a humanoid form, such as a figurine 200 depicted in FIGS. 5-6. The figurine 100 includes a light source 102 and a light sensor 104 disposed in a body 106 of the figurine 100. In an embodiment, the light source 102 and the light sensor 104 are disposed in a bottom surface 108 of the figurine 100.

The light source 102 comprises any available light source such as a light-emitting diode (LED), incandescent light, fluorescent light, or the like. The light source 102 is configured to emit light of at least a wavelength sufficient to reveal or be reflected by the indicator color printed on the image 10. The light source 102 can be tuned to emit light at only a single wavelength, within one or more bands of wavelengths, or across a spectrum of wavelengths. In an embodiment, the light source 102 emits light within a band of wavelengths or a spectrum that corresponds with the color of the indicator color, e.g. the light source 102 emits light within the blue portion of the spectrum of visible light to correspond with a blue indicator color printed on the image 10. In another embodiment, the light source 102 is a multicolor LED, the color of light emitted from which is selectable and/or changeable between a variety of colors.

The light sensor 104 is useable to detect light emitted by the light source 102 that is reflected off of the image 10. The light sensor 104 includes any available sensor technology, such as, for example and not limitation, photosensors, photodetectors, charge-coupled devices (CCD), complementary metal-oxide-semiconductors (CMOS), photodiodes, or the like. In an embodiment, the light sensor 104 comprises a phototransistor. The light sensor 104 may include a filter (not shown) that filters light that is not reflected by the indicator color printed on the image 10. For example, when a light source 102 emits white light and a red indicator color is employed in the image 10, a filter might be employed that only allows light in the red spectrum to pass through to the sensor 104.

The sensor 104 can be selected and configured to detect the light reflected by the indicator color in the image in any desired manner. For example, the sensor 104 might be configured to detect the intensity or luminance of the reflected light or the sensor 104 might sense the percentage of a sampled area that reflects the light emitted by the light source 102.

Figure 6:
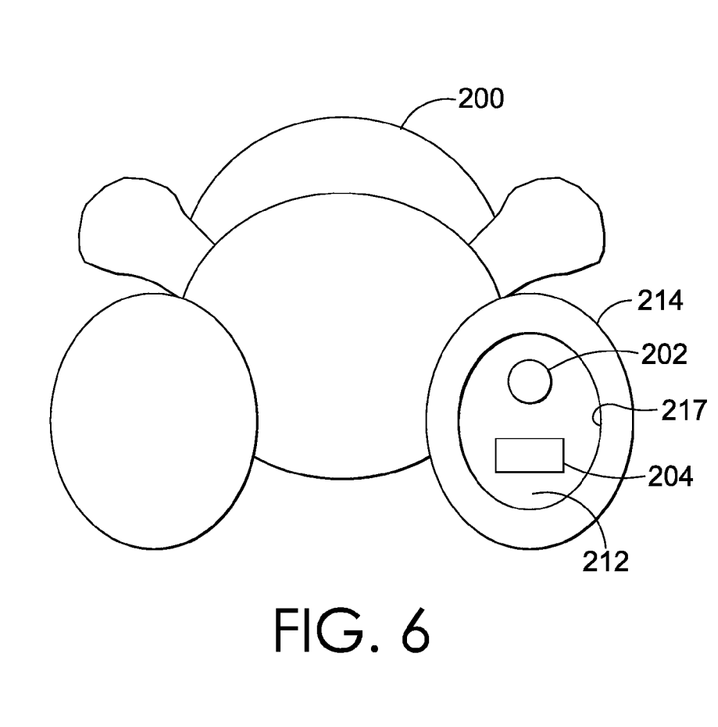
FIG. 6 is a bottom plan view of the figurine of FIG. 5.

The light source 102 and the sensor 104 are disposed on the figurine 100 in close proximity to allow light emitted by the light source 102 to be reflected off of the image 10 and to the sensor 104. In an embodiment, the light source 102 and sensor 104 are disposed within a shroud 110 extending from the bottom surface 108 of the figurine 100. The shroud 110 extends a sufficient distance to contact or nearly contact a surface of the image 10 when the figurine 100 is placed on the surface of the image 10. The shroud 110 thus functions to block all or a substantial portion of environmental light around the figurine 100 and the image 10 from reaching the sensor 104 and interfering therewith. In an embodiment, as depicted in FIG. 6, a light source 202 and sensor 204, similar to the light source 102 and sensor 104, are disposed within a recess 212 in an appendage 214, e.g. a foot, of the figurine 200. A sidewall 217 of the recess 212 thus functions similarly to the shroud 110 to block environmental light from reaching the sensor 204 when the figurine 200 is placed on the image 10.

Figure 7:
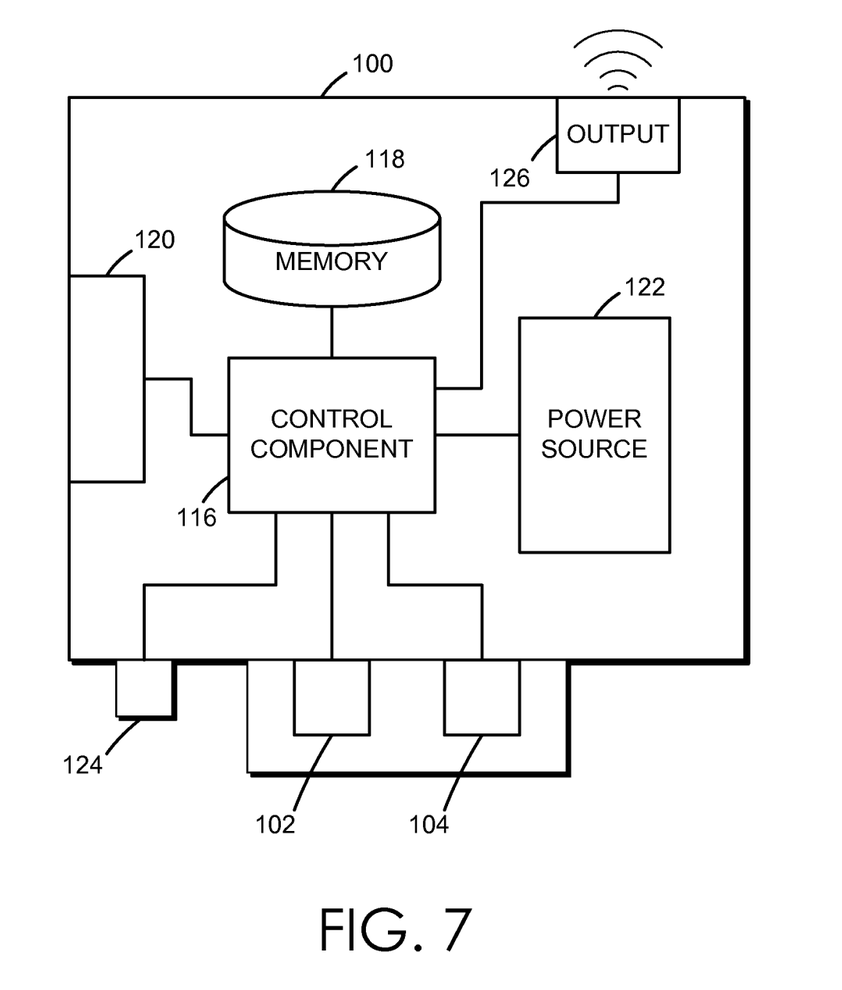
FIG. 7 is schematic view of electrical components positioned in a figurine constructed in accordance with an embodiment of the invention.

As depicted in FIG. 7, the figurine 100 also includes a control component 116 disposed therein. The control component 116 includes a logic controller, processor, or other control component known in the art. The control component 116 may be coupled to a memory 118 disposed in the figurine 100 and/or may include an internal memory. In an embodiment, the figurine 100 includes an adaptor 120 for coupling to a removable memory or external computing device, such as a universal serial bus (USB) adaptor or a memory card adaptor for storing, accessing, and/or receiving data. In an embodiment, the memory 118 is preprogrammed with one or more templates for use by the control component 116.

The memory 118 may include one or more computer-readable media on which a set of instructions is embodied. Computer-readable media include both volatile and nonvolatile media, and removable and nonremovable media. Computer-readable media include media implemented in any way for storing information other than transitory signals, carrier waves, and the like. Examples of stored information include computer-useable instructions, data structures, program modules, and other data representations. Media examples include random-access memory (RAM), read-only memory (ROM), electrically erasable programmable read-only memory (EEPROM), flash memory or other memory technology, compact-disc read-only memory (CD-ROM), digital versatile discs (DVD), holographic media or other optical disc storage, magnetic cassettes, magnetic tape, magnetic disk storage, and other magnetic storage devices. These technologies can store data momentarily, temporarily, or permanently.

The control component 116 is also coupled to a power supply or source 122, such as a dry-cell battery, and to the light source 102 and the sensor 104. Output devices 126 are also coupled to the control component 116 for providing audible, visible, or tactile outputs. The output devices 126 comprise one or more of speakers, lights, vibration components, or the like. One or more functional components (not shown), such as a power switch, mode selector, or the like might also be included.

In an embodiment, the figurine 100 includes one or more activating-light sources 124 disposed therein. The activating-light sources 124 are disposed along the bottom surface 108 of the figurine 100 to enable exposure of the graphics 36A-D in the image 10 to light emitted by the activating-light sources 124. In an embodiment, the activating-light sources 124 are disposed in any position on the figurine 100, e.g. as headlights on a vehicle, or the like. The activating-light sources 124 comprise a light source configured to emit light or other radiant energy sufficient to activate the ink or other formulation in which the graphics 36A-D are printed. In an embodiment, the activating-light sources 124 comprise ultraviolet-light LEDs configured to activate a photochromic ink in which the graphics 36A-D are printed.

With continued reference to FIGS. 1-4, the operation of the figurine 100 with the image 10 is described in accordance with an embodiment of the invention. The description of the use of the figurine 100 with the image 10 is described with respect to the image 10 being placed on a flat surface in a generally horizontal plane and the figurine 100 being placed on top of the image 10. However, such is not intended to limit embodiments of the invention in any way.

Initially, the image 10 is provided and the figurine 100 is powered on. The registration area 14, the feedback areas 16A-F, and the graphics 36A-D are not initially visible or identifiable in the image 10. The registration area 14 is, however, designated as a starting point for interaction with the image 10, e.g. as a starting area for the race course 12. In another embodiment, the registration area 14 is identified in any desired manner. For example, the registration area 14 might comprise a designated location near an edge of the image 10, a designated region associated with the image 10 on a separate card or table of contents page (not shown) that also includes registration areas associated with a plurality of additional images, or a starting point for a line of text, among a variety of others. In an embodiment, the registration area is illustrated as a pair of footprints on which the figurine 200 is to be placed.

The image 10 is first registered with the figurine 100 by placing the figurine 100 on the registration area 14. The light source 102 in the figurine 100 emits light that is directed toward the image 10 and is reflected off the image 10 toward the sensor 104. In an embodiment, the light emitted by the light source 102 is configured to correspond with the indicator color printed in the image 10 such that the light is only reflected by areas of the registration area 14 that include the indicator color. Areas of the registration area 14 that include other colors absorb the emitted light and do not reflect it.

The sensor 104 receives the reflected light and sends a signal to the control component 116 that is useable to identify the level of the indicator color printed in the registration area 14. In an embodiment, the sensor 104 includes a filter that filters out reflected light that is of a wavelength that does not correspond to the indicator color or that does not fall within a band or spectrum of wavelengths that correspond to the indicator color.

In an embodiment, the registration area 14 includes a plurality of sections 34A-B. The figurine 100 is thus moved across the registration area 14 to enable sensing of the levels in each of the sections 34A-B. The figurine 100 might be moved in a direction indicated in the image 10, e.g. the figurine 100 might be moved in the direction of the race course 12 to enable sensing of the levels in the sections 34A-B in a designated order. In another embodiment, a plurality of sensors 104 are employed, each being aligned with a different section 34A-B to sense the levels in each of the sections 34A-B without moving the figurine 100. For example, the figurine 200 might include a light source 202 and sensor 204 in each foot 214 and, each foot 214 is placed on a different section 34A-B.

Based on the level(s) of the indicator color sensed in the registration region 14, the control component 116 identifies a template associated with the image 10. The template might be identified based on sensing of a single or a plurality of levels or based on a particular sequence in which the levels are sensed. As described previously, the template identifies one or more outputs associated with levels of the indicator color that might be sensed in the feedback areas 16A-F. The template might include outputs for more levels than are used in the feedback areas 16A-F. And the template might be customized for use with the particular image 10 or can be useable with a plurality of different images.

In an embodiment, the template is useable with a variety of images 10, the feedback areas 16 of which are appropriately arranged to provide outputs that correspond with the content of a given image 10. For example, if a first level of the indicator color corresponds with an audible output comprising a laughing character, feedback areas in each of a variety of images that employ the template and that include the first level of the indicator color are positioned such that a laughing character output corresponds with illustrations in the image at that position. Additionally, each level of the indicator color may correspond with different outputs for each template that is provided, e.g. for a first template the first level corresponds with a laughing character, while in a second template the first level corresponds with flashing lights and vibrations.

In an embodiment, a plurality of indicator colors are used. An equal plurality of light sources 102 and sensors 104 might also be employed or any combination thereof that is useable to sense the levels of each of the indicator colors can be used. In such an embodiment, the template can be identified based on the level(s) of one or more of the indicator colors sensed in the registration area 14.

Upon identification of the template that corresponds with the registration area 14, play may commence. In an embodiment, an output is provided that indicates successful identification of the template. An output might also be provided that corresponds with the image 10. For example, a sound of a roaring engine or squealing tires might be provided for the image 10. In an embodiment, the provided output is of short duration or the output persists as background or ambient sounds that might be expected in an environment illustrated in the image 10. The output might persist until a feedback area 16A-F is encountered, until a subsequent registration area 14 is encountered, or until the figurine 100 is powered off.

A user moves the figurine 100 about the image 10, for example along the race course 12. When the figurine 100 encounters a feedback area 16A-F, a level of the indicator color is sensed and an output identified based on the template is provided. For instance, a user moving the figurine 100 along the race course 12 might encounter the feedback areas 16A-F. In the feedback area 16A, the user might receive the sound of cheers from the bystanders 24; in the feedback area 16B the figurine might vibrate and sounds of vehicle crashing into the fallen tree 26 might be provided; in the feedback area 16C sounds of someone slurping a drink through a straw might be provided; in the feedback area 16D sounds of screeching tires and illuminated brake lights might be provided as if the figurine 100 hit the oil slick 30; and at the feedback area 16E sounds of cheers for finishing a race might be provided. The user might also deviate away from the race course 12 and encounter the feedback area 16F at which sounds of children playing in a park or someone snoring while taking a nap in the park 32 might be provided.

In an embodiment, the figurine also includes the activating-light sources 124. Thus, as the figurine 100 is moved along the race course 12 and over the graphics 36A-D the graphics are temporarily revealed to the user. As the figurine 100 passes over the graphic 36A, the activating-light sources, e.g. ultraviolet LEDs, activate the photochromic ink used to print the graphic 36A and an arrow pointing the way is revealed. Subsequently, the arrow graphic 36A slowly disappears as the photochromic ink returns to an equilibrium state. As the figurine 100 is further moved along the race course 12, the graphic 36B is revealed to show the word "GO!," the graphic 36C is revealed to depict a cold beverage, and the graphic 36D is revealed to show a checkered flag. It is understood that any variety, number, and arrangement of graphics can be employed in embodiments of the invention without departing from the scope described herein. The graphics 36A-D might correspond with one or more of the feedback areas 16A-F, such as the graphic 36C and the feedback area 16C and/or the graphics 36A-D might be associated with outputs provided for the corresponding feedback area 16A-F.

In an embodiment, the image 10 is one of a number of images included in a book or other set of images. Each of the images in the book might include a registration area 14 that includes a different level(s) of the indicator color and thus is associated with a different template. As such, a play pattern or series of outputs provided by the figurine 100 for each of the images can be different. In another embodiment, a plurality of such books is provided. Each of the books may include a different figurine but, each of the figurines is preprogrammed with the same templates and with outputs that correspond to the template and to the individual figurine.

The outputs associated with the levels of indicator colors for a given template can be different for each figurine but are of a similar type of output. For instance, a template might include outputs for three levels of the indicator color; outputs for a first level being associated with a character laughing; outputs for a second level being associated with a character crying; and outputs for a third level being associated with lights and a tactile output. Thus, each figurine includes at least one character laughing output, character crying output, and a light and tactile output but, the outputs need not be the same, e.g. one figurine might include a boy's voice while a second figurine might include a girl's voice.

As such, the figurines are interchangeably useable with each of the different books. And using the templates, the outputs provided by each different figurine appropriately correspond with a selected image in a selected book. For example, the figurine 100 might be used with another book of images that illustrate a space scene. Using the template identified via the registration area on the space scene image the figurine's outputs appropriately correspond to the feedback areas of the space scene image, e.g. an audible output of a character laughing is provided upon encountering a feedback area in the space scene image in which the figurine 100 would be expected to laugh.

In an alternate embodiment, the figurine 100/200 can be used in connection with a collection of items to enhance an event, such as a birthday party. Attendees of the party would be given a figurine 100/200 as a party favor. The figurine 100/200 would generally be of a shape that complements the theme of the party. For example, if it is a princess themed birthday party, the figurine 100/200 may take the form of a princess. Decorations and party supplies that help create the theme could be used in connection with the figurine 100/200. For example, the princess themed paper plates and napkins that the kids use for their snack/cake can have feedback areas thereon such that their figurines talk to them upon scanning that portion of the plate/napkin. The figurine may provide a message related to the item (e.g., "A princess always uses a napkin to wipe her mouth after eating.") Similarly, other party décor items may be provided that contain feedback areas (similar to 16A-16E) or hidden graphics (similar to 36A-D) printed thereon. For example, game cards may be distributed to the kids for them to scan with their figurine to see what they can get the figurine to say. Other take home items, such as sheets and stickers may be given to the kids as they leave so they can extend the party fun after the party is over. Additionally, coordinating thank you cards can be provided with feedback areas/hidden graphics so the attendee child can hear yet another personalized message from the figurine (e.g., "Thanks again for attending the birthday party! Hope you had a great time, friend.").

Many different arrangements of the various components depicted, as well as components not shown, are possible without departing from the scope of the claims below. Embodiments of the technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

What claimed is:

1. A system for interactive play with a printed image, the system comprising:
    a printed image having a registration area and a plurality of feedback areas defined therein, the registration area and each of the plurality of feedback areas having an indicator color printed therein at a respective level;
    a figurine that is positionable on the printed image at desired location, the desired location including one of the registration area, one of the plurality of feedback areas, or an area of the image that is not the registration area or one of the plurality of feedback areas;
    a light source disposed in the figurine that reveals the indicator color at the desired location;
    a light sensor disposed in the figurine that senses the level of the indicator color revealed by the light source at the desired location;
    an output component that provides a predetermined output associated with the level of the indicator color at the desired location; and
    a controller disposed in the figurine that identifies a predefined template associated with the level of the indicator color printed in the registration area and determines an output to be provided for each of the plurality of feedback areas based on the template.

2. The system of claim 1, wherein the registration area includes a plurality of sections, each section including the same or different level of the indicator color, and the levels of the indicator color in the plurality of sections are used to identify the predefined template.

3. The system of claim 1, wherein the printed image is one of a plurality of printed images, each of the printed images having a different registration area that is useable to identify a different predefined template.

4. The system of claim 1, wherein the level of the indicator color is a percentage of the area covered by the indicator color in the registration area and each of the plurality of feedback areas.

5. The system of claim 1, wherein a plurality of indicator colors are used, and wherein a plurality of corresponding light sources, each configured to reveal a respective one of the plurality of indicator colors are disposed in the figurine.

6. The system of claim 1, wherein the output is one or more of an audio output, a visual output, and a tactile output.

7. The system of claim 1, wherein the printed image includes a graphic printed in a photochromic ink that, in an equilibrium state, is substantially not visible to a reader, and wherein the figurine includes an activating-light source which activates the photochromic ink to cause the photochromic ink to change color and temporarily reveal the graphic.

8. The system of claim 1, wherein the printed image is one or more of a game board, a poster, pages in a book, a greeting card, a foldable play mat, a story board, and an instructional image.

9. A method for interactive play with a printed image, the method comprising:
    providing a printed image having a registration area and a plurality of feedback areas, the registration area and each of the plurality of feedback areas having an indicator color printed therein at a respective level;
    providing a figurine that includes a light source configured to illuminate the indicator color and a sensor configured to sense the level of the indicator color illuminated by the light source;
    sensing by the sensor in the figurine a first level of the indicator color in the registration area of the printed image;
    identifying, by a controller disposed in the figurine, a predefined template associated with the printed image based on the level of the indicator color printed in the registration area, the predefined template including one or more predetermined outputs associated with the level of the indicator color printed in each of the plurality of feedback areas;
    sensing, by the sensor in the figurine, a second level of the indicator color printed in a first feedback area of the plurality of feedback areas;
    determining, by the controller, a first predetermined output of the one or more predetermined outputs associated with the second level of the indicator color; and
    providing the first predetermined output.

10. The method of claim 9, further comprising:
    exposing a graphic in the printed image to an activating-light source disposed in the figurine, the graphic being printed in the printed image in a photochromic ink; and
    producing a temporary view of the graphic in the printed image, the temporary view of the graphic produced by activation of the photochromic ink via the activating-light source causing the photochromic ink to change color.

11. The method of claim 9, wherein a second predetermined output associated with an environment depicted in the printed image is provided upon identification of the predefined template.

12. The method of claim 9, wherein the first predetermined output produced by the figurine is one or more of an audio output, a visual output, or a tactile output that is associated with one or more of the printed image and the first feedback area.

13. The method of claim 9, wherein the registration area includes a plurality of sections, each section of the plurality having the indicator color printed therein at a respective level.

14. The method of claim 13, wherein sensing by the sensor in the figurine the first level of the indicator color in the registration area of the printed image further comprises:
    sensing the respective levels of the indicator color in each of the plurality of sections of the registration area in a predetermined order.

15. An apparatus for interactive play with a printed image, the apparatus comprising:
    a body configured to be placed in contact with or adjacent to a surface having an image printed thereon, the image including a registration area and a plurality of feedback areas, the registration area and the plurality of feedback areas each having a respective level of an indicator color printed therein;
    a light source disposed in the body that exposes the surface to light emitted by the light source, the light source being configured to illuminate the indicator color;
    a light sensor disposed in the body that receives light from the light source that is reflected off the surface;
    a controller disposed in the body that determines the level of the indicator color sensed by the sensor and identifies a predefined template associated with the image based on the level of the indicator color sensed in the registration area, the template including one or more predetermined outputs associated with each of the respective levels of the indicator color, and the controller identifying a first output from the one or more predetermined outputs to be provided upon determining the respective level of the indicator color in an associated feedback area in the image; and an output component that provides the first output, the first output being one or more of an audio output, visual output, and a tactile output.

16. The apparatus of claim 15, further comprising:
an ultraviolet-light source disposed in the body that at least temporarily activates photochromic ink printed on the surface.

17. The apparatus of claim 15, wherein the body resembles a toy vehicle and the light source and light sensor are disposed along the bottom side of the toy vehicle.

18. The apparatus of claim 15, wherein the body resembles an animal-like or humanoid figure and the light source and light sensor are disposed within an appendage thereof.

19. The apparatus of claim 15, wherein the light source and light sensor are enclosed within a shroud that reduces interference from environmental light.

* * * * *